(12) United States Patent
Didik

(10) Patent No.: US 7,283,055 B2
(45) Date of Patent: Oct. 16, 2007

(54) ELECTRIFIED COVER SAFEGUARD

(76) Inventor: Frank Theodore Didik, 83-45 Broadway, 104, Elmhurst, NY (US) 11373

( * ) Notice: Subject to any disclaimer, the term of this patent is extended or adjusted under 35 U.S.C. 154(b) by 218 days.

(21) Appl. No.: 11/176,563

(22) Filed: Jul. 6, 2005

(65) Prior Publication Data

US 2006/0008322 A1    Jan. 12, 2006

Related U.S. Application Data

(60) Provisional application No. 60/586,928, filed on Jul. 10, 2004.

(51) Int. Cl.
*G08B 23/00* (2006.01)

(52) U.S. Cl. ............... 340/573.1; 324/457; 340/686.6; 340/650; 404/25

(58) Field of Classification Search ............ 340/686.6, 340/686.5, 573.1, 650; 324/457, 117 R; 404/25
See application file for complete search history.

(56) References Cited

U.S. PATENT DOCUMENTS

| 4,983,954 | A | * | 1/1991 | Huston | 340/657 |
| 5,200,734 | A | * | 4/1993 | Lin | 340/508 |
| 5,952,820 | A | * | 9/1999 | Thrasher et al. | 324/119 |
| 6,600,426 | B1 | * | 7/2003 | Sacks et al. | 340/664 |
| 6,788,215 | B1 | * | 9/2004 | White | 340/657 |
| 2004/0080320 | A1 | * | 4/2004 | Golub | 324/457 |

* cited by examiner

Primary Examiner—Brent A. Swarthout

(57) ABSTRACT

A warning device that turns on a warning light and or a warning sound to indicate when a manhole cover or a service box cover or a metal pole for lights, traffic lights, transformers or others has become dangerously electrically charged. The invention is attached to the frame of a manhole cover, or a service box cover or a metal pole. The light and sound warns people to stay off the covers and their surrounding areas, and the surrounding areas of the metal poles.

4 Claims, 6 Drawing Sheets

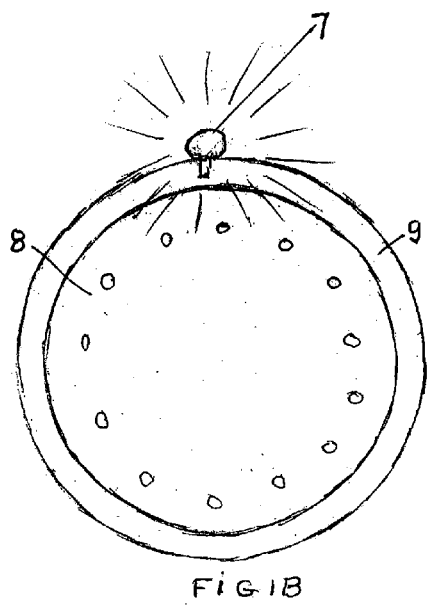
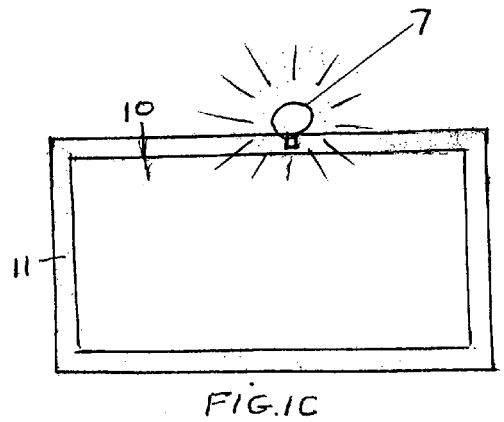
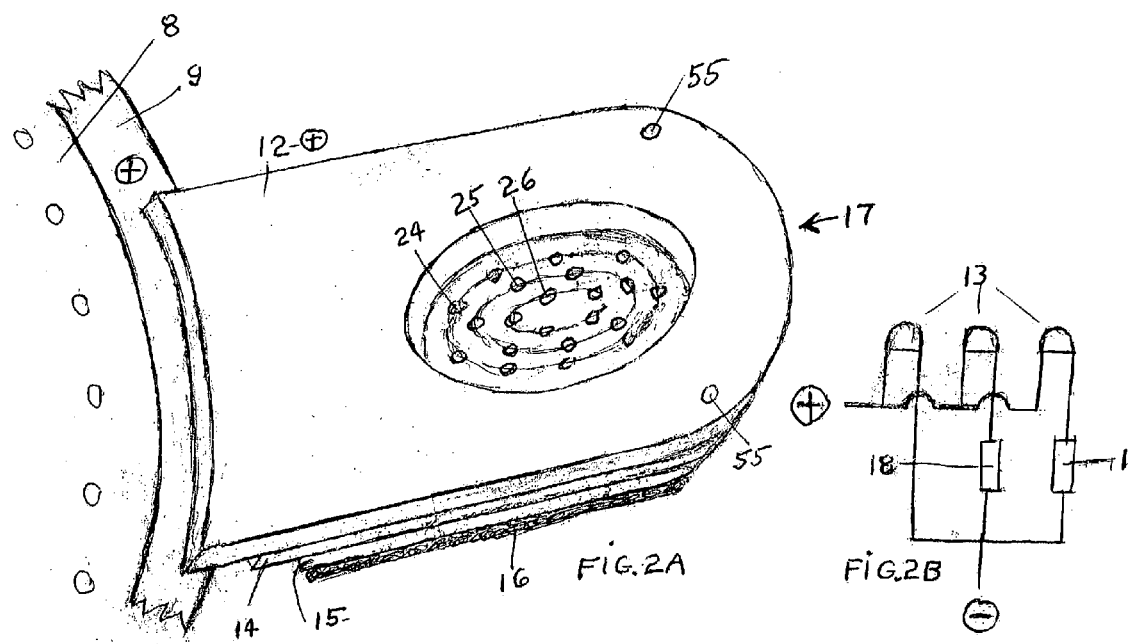

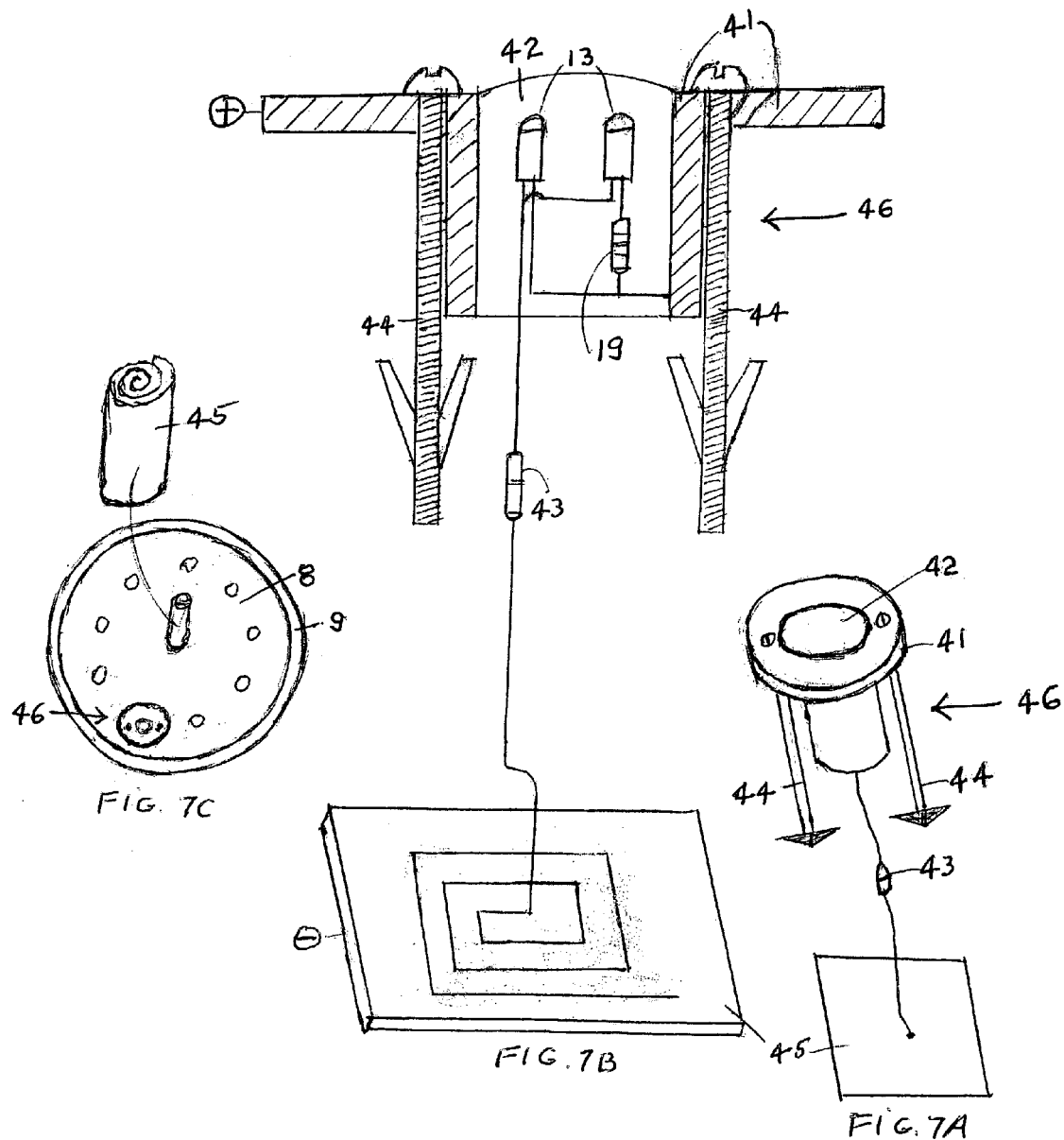

ELECTRIFIED COVER SAFEGUARD

CROSS REFERENCE TO RELATED APPLICATION

This application claims the benefit of Provisional application Ser. No. 60/586,928 filed Jul. 10, 2004.

FIELD OF THE INVENTION

This invention relates to a warning and safety device that a manhole cover, a service box cover or a metal pole is electrically charged.

BACKGROUND OF THE INVENTION

This invention relates to a warning device that is attached to the frames of manhole and service box covers and metal poles to warn people that the covers and poles are electrically charged due to a mishap in the manhole and service box or pole, and are dangerous. This invention is composed of a variety of lights, sound makers, sizes and shapes, but it is still the same warning device against electrically charged manholes, service boxes, and metal poles for street lights, traffic lights, transformers and others. Remote access devices to warn repair offices of charged manholes, service boxes and metal poles are also included.

PRIOR ART

No prior art was found relating to the warning device for the covers and poles that have become electrified. When the electric company discovers an electrified cover and pole, they immediately put a barrier around it, and repair it.

SUMMARY

It is the object of this invention to protect peoples lives, from being electrocuted, and injuries from severe electric shock, by warning them that a particular manhole or service box cover or metal pole is electrically charged, when the invention emits a warning light or sound. The light or sound warns people that the cover is dangerous and not to walk on it and its surrounding area, especially if the area is wet from rain, snow or other water sources. The charged pole also should not be touched. Pets must also be kept off of the covers and away from the poles and their surrounding areas. As it is today, there is no way that a person can tell if a manhole or service box cover or pole is electrically charged by sight or by looking at it. The electric company can inspect a cover or pole for a charge in the morning, find none, and the cover or pole can become charged in the evening by some mishap in the manhole or service box or pole. This invention will provide a permanent warning.

BRIEF DESCRIPTION OF THE DRAWINGS

FIG. 1A shows the invention and the various parts it is composed of.

FIG. 1B shows the top view of a manhole cover, and how the invention is attached to its frame.

FIG. 1C shows the top view of the service box cover, and how the invention is attached to its frame.

FIG. 2A Shows the invention being flat and using red light emitting diode (LED) lights.

FIG. 2B shows the parts and composition of the LED Light Emitting Diode light, in the flat invention in FIG. 2A.

FIG. 7A show the invention that is placed in a hole in the manhole cover while its ground foil is dropped to the bottom of the manhole.

FIG. 7B shows the parts and composition of the invention in FIG. 7A.

FIG. 7C shows how the invention in FIG. 7A is installed in a manhole cover. The invention must be installed in the same hole that the ground foil is dropped.

FIG. 8A shows the invention that contains a long life battery to power the light and sound where the grounding is poor. The electricity from the charged cover causes the relay to activate the battery that causes the lights and sound to go on.

DETAILED DESCRIPTION OF THE DRAWINGS

Figure 1A:
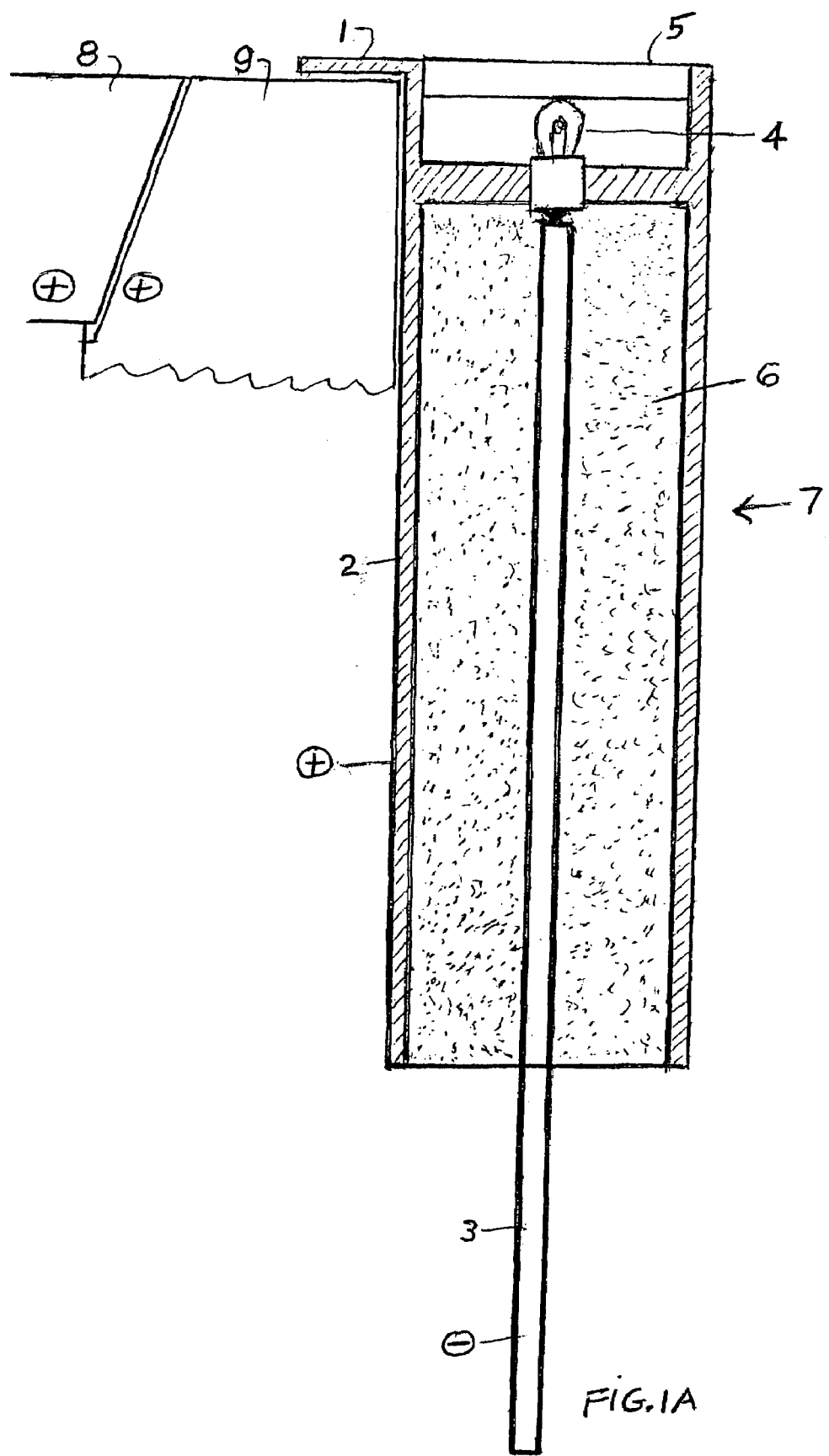

Referring to the drawings, FIG. 1A–preferred embodiment shows the various parts of the invention variety 7.

1. is the attachments
2. is the metal casing
3. is the metal ground rod
4. is the bulb
5. is the lens
6. is the insulation Manhole 8 and its frame 9 are not part of the invention, but shows how the invention's attachment is attached to the frame.

The positive electrical charge from the frame 9 is used by this invention by passing through the attachment 1, through the metal casing 2, through the bulb 4, lighting it, then through the negative metal ground rod 3, that is separated from the positive charged metal casing 2 by non conductive insulation 6, and on into the ground. The light is seen through lens 5. The manhole cover 8 is also electrically charged.

FIG. 1B and FIG. 1C shows the top views of a manhole cover 8 and its frame 9, and a service box cover 10 and its frame 11, with the invention 7 attached to their frames. Holes are drilled or dug next to the frames and the invention is deposited and covered. Then the invention is attached to the frames 9 and 11 by their attachments 1.

The invention can be attached to the cover's frames by various ways such as welding, spot welding, bolted, screwed on, clamped on or other means.

The voltage in the manhole and service boxes is usually the same as in a typical house, ranging from 110 to 220 volts, though the voltage can also be higher or lower, depending on the area or usage, and the bulbs and sound makers must be suitable for the voltage.

Manhole and service box covers and frames become dangerously electrically charged when bare, exposed electric wires in the manhole and service box touch their frames. The wires become bare and exposed by corroded wire covering, by water seepage, by salt used for winter snow and ice, by chemical seepage and by erosion to name a few.

The electricity from the electrically charged frames is used to power the invention. Only when the frames become charged will the electricity flow into the invention and cause the warning light and sound to go on. The exception is when a battery is used because of poor grounding, as in FIG. 8A and FIG. 8B.

The light from the bulb can be steady or blinking or flickering.

The bulb can be of any color, red, green, yellow, blue or other, but red would be most likely the color preferred.

More than one warning can be attached to a covers frame.

The invention is waterproof for the best results.

Any light source can be powered by the man hole cover electricity such as a bulb with a filament, light emitting diodes, electro luminescence devices, neon gas bulbs, florescent bulbs or other such light source.

The lens 5 also can be of any color, red, green, yellow, blue or other instead of the bulb, but a red lens would be most likely the color preferred.

The non conductive insulation 6 used for separating the positive outside metal casing 2 from the negative metal ground rod 3, can be of various types such as ceramic, glass, bakelite and non conductive plastic among others.

The invention can be made in any size and shape, elongated, flat, round, curved and other to suit the frame.

A sound maker can replace the bulb 4 and lens 5 to make warning sounds such as buzzing, humming, squealing, chirping and beeping, by
 (a) mechanical buzzers
 (b) piezo buzzers
 (c) self drive piezo transducers
 (d) external drive piezo transducers
 (e) beepers
 (f) and intermittent beepers and other intermittent sound makers, to name a few.
 (g) sirens The sound makers must be suitable for amount of voltage, as the bulb 4, 110 to 120 volts or other.

An illuminant warning can replace the light and sound warnings by coating a material with an illuminant such as phosphor and using the electricity from various covers that may become electrically charged, to cause it to glow or light up.

This invention can be used for any size or type of metal cover or metal pole that may become electrically charged.

Every year hundreds of manhole and service box covers and poles become electrically charged. People and pets have been electrocuted or severely injured by stepping on them.

This invention would be useful in all cities and towns and rural areas, here, and abroad.

FIG. 2A-*additional* embodiment shows the various parts of the flat invention variety 17:
 8 is the manhole covers
 9 is the manhole frame
 12 is the top positive plate attached to the frame
 13 are three (3) rings of LED diode lights
 14 is a plastic insulation separating plates 12 and 15
 15 is the ground plate
 16 is conductive glue attached to the ground plate for better contact and stability
 55 are holes to screw invention into the ground The electrical charge from frame 9 flows through plate 12 to the LED diodes through wires in a grove on the bottom of plate 12, then through the ground plate 15 and conductive glue 16 to the ground, and the LED diodes light up. The LED diodes 13 are sunk below the surface of plate 12 and clear plastic fills the hole level with the top of the plate. The screw holes 55 are to screw the invention to the ground by insulating them from plate 12 and fastening plate 15. The screws are optional.

FIG. 2B shows the parts and composition of the red LED diodes in the flat invention in FIG. 2A.
 13 are the red LEDs of 2.5V 20 ma, 500 mcd
 18 is a 25K ohm resistor for lower frame voltage
 19 is a 127k ohm resistor The wires and resistors are in a groove on the bottom of plate 12

This is only one of many configurations possible for the electronics.

Figures 3A, 3B:
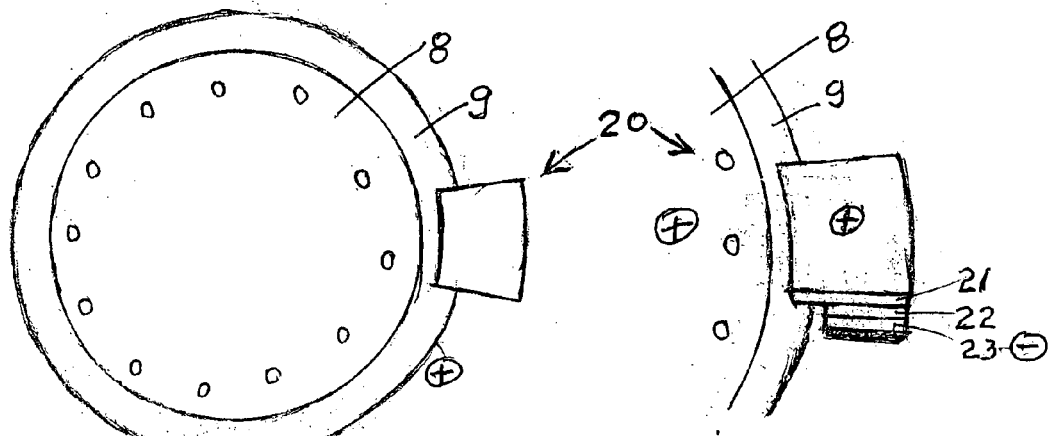
FIG. 3A shows an electro-luminescent light plate attached to the frame and ground.
FIG. 3B shows the parts of the electro-luminescent light plate in FIG. 3A.

FIG. 3A and FIG. 3B–alternative embodiment show an electroluminescent plate, invention variety 20, attached to the frame and ground.
 8 is the manhole cover
 9 is the frame
 21 is a positive charged transparent electrode
 22 is a thin layer of phosphor
 23 is a negative charged opaque electrode The electricity from frame 9 flows through plate 21, then the layer of phosphor 22, and finally plate 23 into the ground, causing the phosphor to glow. This invention acts as a capacitor. Conductive glue can be placed on the bottom of plate 23 for better grounding.

Figures 4A, 4B:
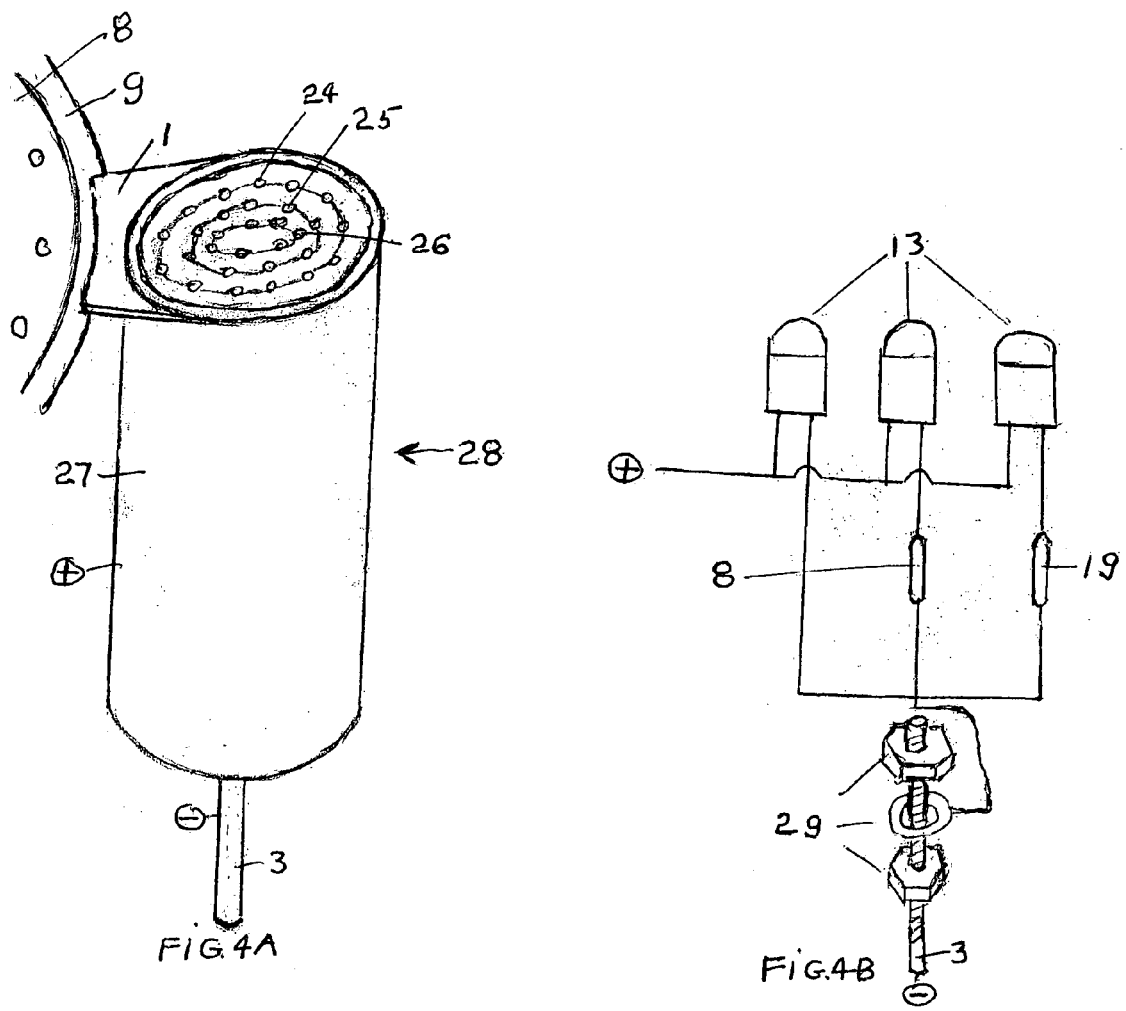
FIG. 4A shows the invention elongated as in FIG. 1A, with three circles of red LED diode lights.
FIG. 4B shows the parts and composition of the elongated invention in FIG. 4A.

FIG. 4A and FIG. 4B–additional embodiment, invention variety 28, shows an elongated warning device with three (3) circles of LED diode lights, and is similar to FIG. 1A.
 1 is the attachment
 3 is the grounding rod
 8 is the manhole cover
 9 is the frame
 13 are LED diode bulbs (lights)
 18 is a 25K ohm resistor for lower voltage to allow the LED bulbs to light up
 19 is a 127K ohm resistor
 24 is the outer circle of LEDs
 25 is the middle circle of LEDs
 26 is the inner circle of LEDs
 27 is the metal casing
 28 is the LED's attachment to the ground rod 3.

This is only one of many configurations possible for the electronics.

The electrical charge from frame 9 flows through attachment 1, then the casing 2, then the circles 24, 25 and 26 of LED bulbs 13, embedded in the casing, 27, and finally to the ground rod 3, into the ground, causing the bulbs to light up.

FIG. 4B shows the parts and composition of the LEDs which are inside the casing 27 with insulation.

Figures 5A, 5B, 5C:
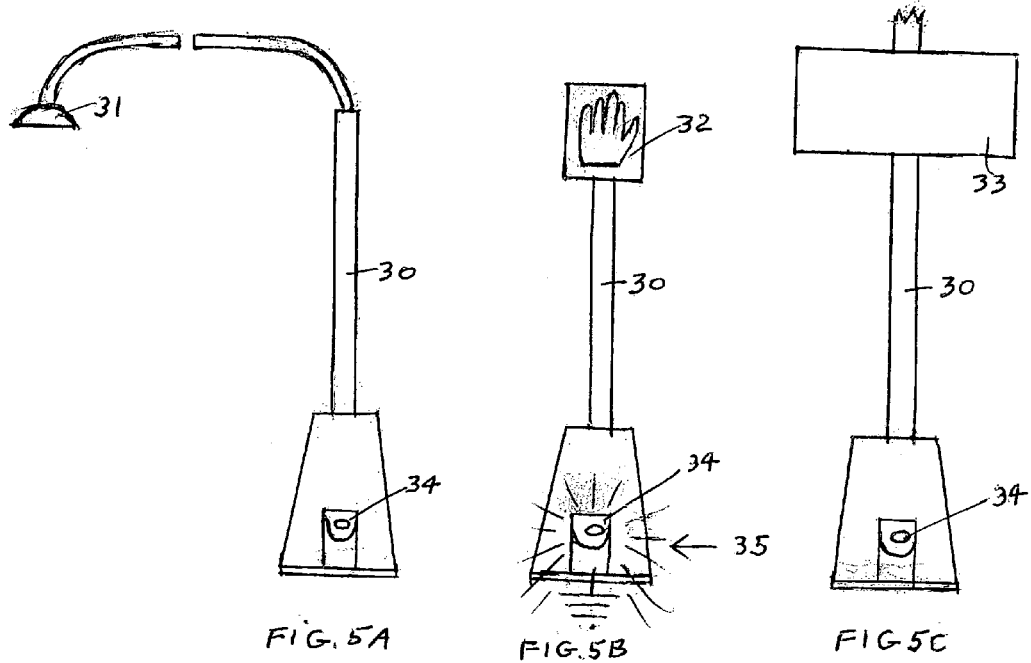
FIG. 5A shows the invention containing a light or sound maker attached to the base of a metal pole for a street light.
FIG. 5B shows the invention containing a light or sound maker attached to the base of a metal pole for a traffic light.
FIG. 5C shows the invention containing a light or sound maker attached to the base of a metal pole for a transformer.

FIG. 5A, FIG. 5B and FIG. 5C–additional embodiment, of invention variety 35, shows the invention container 34 attached to metal poles and contain a light, or sound maker or an electroluminescent device such a rope, tape or sheet (plate).
 30 are the metal poles
 31 is a street light
 32 is a traffic light 33 is a transformer 34 is the invention container with lights or sound makers or electroluminescent devices attached to the metal poles and grounded.

If the metal poles become electrically charged, the electricity flows from the metal poles, then through the invention and finally into the ground, creating a light or sound warning.

Figures 6A, 6B:
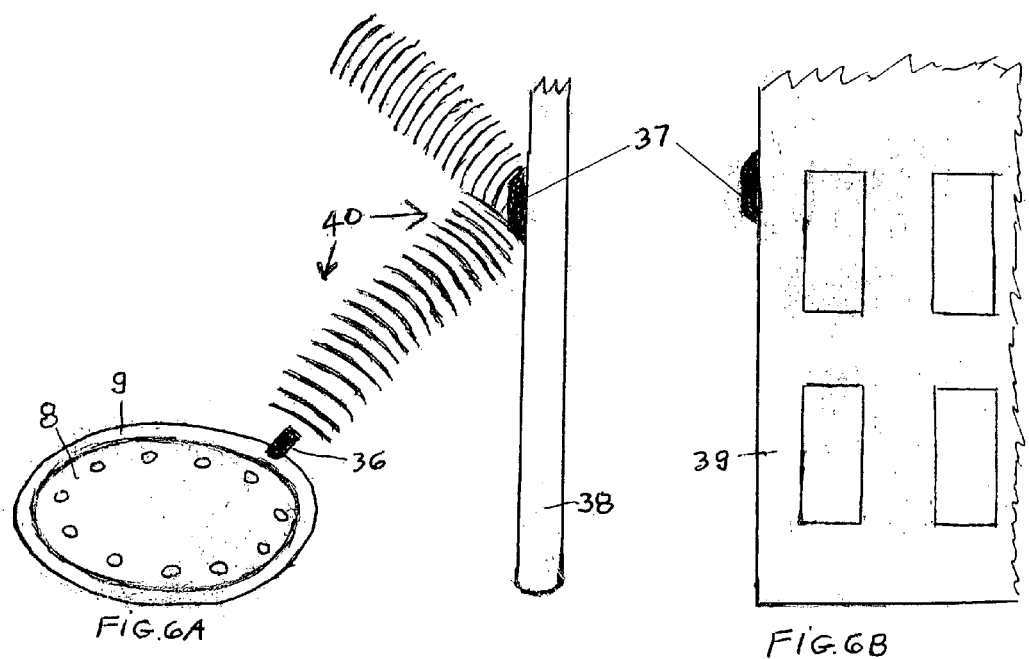
FIG. 6A shows a remote access invention that notifies the repair office when the manhole cover becomes electrically charged.
FIG. 6B shows the analog, digital, or 911 cellular, relay unit of the invention in FIG. 6A on a house.

FIG. 6A and FIG. 6B–alternative embodiment shows a remote access, invention variety 40, sending signals from the manhole frame, to a pole, house or other structure, and on to the repair office to warn them that the manhole has become electrically charged.

8 is the manhole cover 9 is the manhole frame 36 is a remote control switch 37 is an analog, digital, 911 cellular or Radio Frequency Identification circuit (RFID) relay 38 is a pole that the analog, digital, 911 cellular or RFID relay is attached to 39 is a house that the analog, digital, 911 cellular relay is attached to. Any available structure in the area can be used.

The remote control switch 36 is activated by the electrically charged manhole frame and sends an analog or digital, signal to to a receiver on a nearby pole, house or other structure which activates an actuator, which may be powered by the electricity from the charged cover, a long life battery, solar energy or combination thereof, and then relays a coded signal to the central repair office's receiving system which can be a radio receiver, a local area network, the internet or a wireless analog or digital receiver such as a cellular telephone, thus providing the exact location of the charged manhole, service box or metal pole and voltage and amperage information, thus indicating the degree of danger and defect.

Remote access has the ability to log onto a network from a distant location. This implies a computer, a modem and some remote access software to connect to the network.

When charged an analog or digital code from a radio code from the radio transmitter on the manhole frame sends and monitors the switch on the pole or house. When it receives the signal from the manhole switch, it powers the actuator to send a signal to a monitoring device, computer or a wireless device such as a cellular phone or radio monitor.

It is not necessary to explain the makeup of the analog, digital, cellular, and RFID transmitter and receiver anymore than it is to explain the makeup of the bulb. There are hundreds of them on the market. They are not being patented, but are only used with warnings like the bulb.

FIG. 7A, FIG. 7B and FIG. 7C–additional embodiment shows the invention variety 46 on and into the manhole.

8 is the manhole cover 9 is the manhole frame 13 is the LED diode lights 41 is the metal frame work 42 is the non conductive clear plastic 43 is a wire couple 44 are butterfly screws that secure the invention to the manhole 45 is the flexible grounding plate that is dropped through a hole in the manhole cover and grounds the invention on the bottom of the manhole 46 is the invention that is secured to the same hole that the foil is dropped into.

FIG. 7A shows the invention variety 46

FIG. 7B shows the parts and makeup of the invention

FIG. 7C shows how the flexible grounding plate is inserted through one of the holes in the manhole cover, and how the invention 46 is secured in the same hole.

The electrical charge flows from the manhole 8, through the metal frame work 41, through the LED diode lights 13, and then down to the ground foil 45 on the bottom of the manhole, lighting the LEDs 13.

Figure 8A:
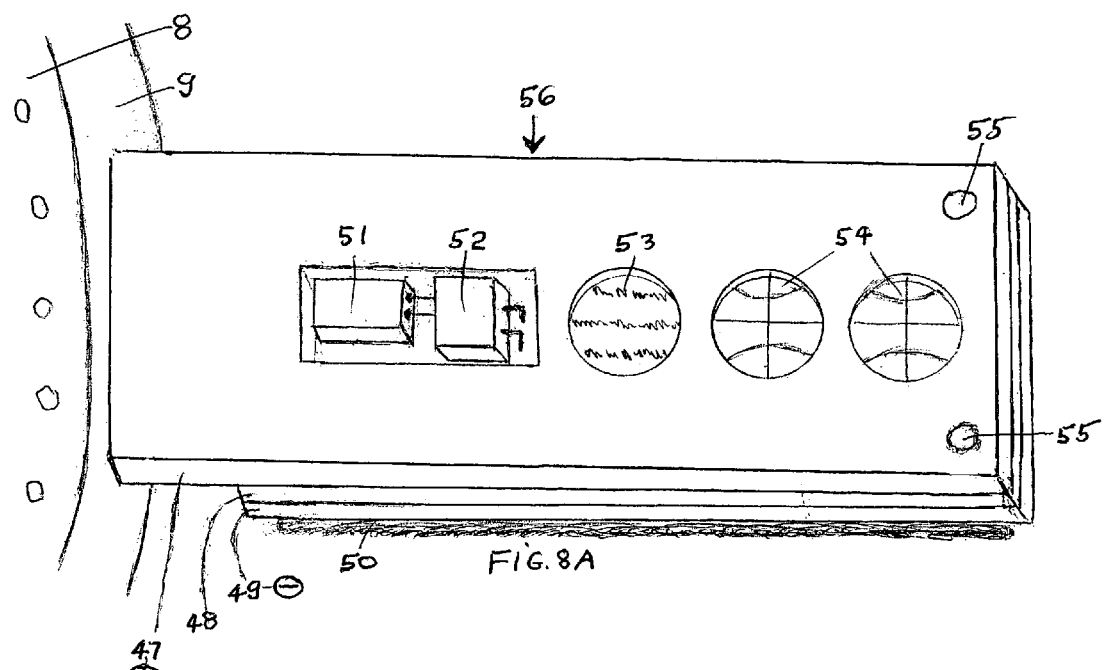

FIG. 8A—additional embodiment shows the flat invention variety 56 that contains a long term battery, relay, a siren or other sounder and LED diode lights.

8 is a manhole cover 9 is a manhole frame 47 is a metal plate attached to the frame for a positive charge 48 is a sheet of insulation 49 is a metal plate for a negative charge 50 is conductive glue that helps secure plate 49 to the ground and for better grounding.

51 is a long term battery 52 is a relay 53 is the siren, sunken below the surface of plate 47 and covered with a thin layer of clear plastic and a grill on top of the plastic for protection.

54 are red diode lights

When the manhole frame 9 is charged, electricity flows to the metal plate 47 activating the relay 52, causing electricity from battery 51 to flow to the siren 53 and LED diode lights 54 causing them to sound off and light up. The two LED diodes are sunk ⅛ of an inch below the surface of plate 47 and clear plastic fills the holes till they are level with the top of plate 47. The groove that the battery 51 and relay 52 are in, can be filled with clear plastic, or a water proof cover can be screwed over them. The screw holes 55 are to screw the invention to the ground by insulating them from plate 47 and fastening plate 49. The screws are optional.

Figure 8B:
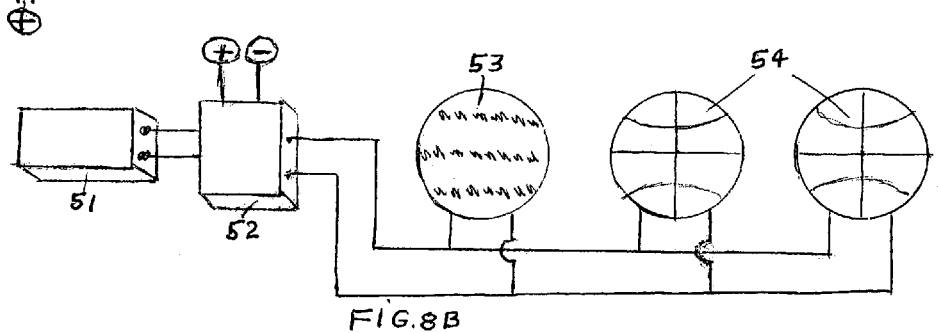
FIG. 8B shows the parts and composition of the invention in FIG. 8A.

FIG. 8B shows the parts and composition of the flat invention in FIG. 8A with a battery.

51 is a battery 52 is a relay 53 is a siren sound maker 54 are two (2) LED diode lights The wires are in a groove on the bottom of plate 47, connecting all the parts and components together.

I claim:

1. A warning device that a manhole cover or a service box cover or a metal pole for street lights, traffic lights and transformers has become dangerously electrically charged and people should stay off them and their surrounding areas to avoid being electrocuted or injured by severe electric shock, comprising:

(a) a warning light or sound generator that goes on when the cover or box or metal poles become electrically charged;

(b) an attachment that attaches the warning device to cover or box frames and metal poles;

(c) a waterproof outside metal casing that houses the warning device;

(d) a light source, that can be powered by electricity from the manhole cover or service box cover or metal pole, including at least one of a bulb with a filament, light emitting diodes, electro luminescence devices, neon gas bulbs, florescent bulbs or other light source, that is the color red or some other color;

(e) a sound source that can be powered by electricity from the charged manhole or service box covers or metal poles, including at least one of mechanical buzzers, piezo buzzers, self drive piezo transducers, external drive piezo transducers, beepers, sirens, intermittent beepers and other sound makers;

(f) a metal ground rod that is deposited in or on the ground for a negative charge;

(g) non conductive insulation that separates a positive charged casing from the negative ground rod;

(h) and a lens for the warning light to pass through that is the color red or some other color; and (i) whereby the warning device can be flat, round or curved.

2. The warning device in claim 1, whereby the warning light is replaced by an illuminant warning, is composed of a transparent top electrode attached to a manhole cover frame or a service box frame or a metal pole, and a bottom opaque electrode that is grounded with a thin layer of phosphor or other illuminant between them, and using the electric charge from the frames and metal poles to cause the phosphor to glow or light up.

3. A warning device in claim 1, in which a relay and battery or a solar panel and relay or a combination thereof can be added whereas the charge from the covers or poles activate the relay, which activates the battery causing its electricity to flow to the light source and sound source, for areas where a grounding is weak.

4. A light and sound warning device that is placed in one of the holes in a manholes cover, with a flexible or ridgid grounding plate that is dropped through the same hole, to the bottom of the manhole for a ground, whereas electricity from a change cover flows through device metal frame work, then through an LED or sound maker connected to the frame work and then down through a connecting wire to the grounding plate at the bottom of the manhole and into the ground, causing the LED and sound maker to light up and sound off to indicate the charge condition of the manhole cover.

* * * * *